United States Patent Office 3,658,765
Patented Apr. 25, 1972

3,658,765
PREPARATION OF POLYAMIDE FROM ε,ε'-BIS(ε-CAPROLACTAM)
Antonie Veermans and Robert J. de Kock, Geleen, Netherlands, assignors to Stamicarbon N.V., Heerlen, Netherlands
No Drawing. Original application May 2, 1967, Ser. No. 635,339. Divided and this application Aug. 29, 1969, Ser. No. 871,068
Claims priority, application Netherlands, May 5, 1966, 6606079
Int. Cl. C08g 20/18
U.S. Cl. 260—78 L    3 Claims

ABSTRACT OF THE DISCLOSURE

The compound ε,ε'-bis(ε-caprolactam) is disclosed. ε,ε'-Bis(ε-caprolactam) is prepared by ultraviolet ray irradiating ε-caprolactam in the presence of ketone activation agents. ε,ε'-Bis(ε-caprolactam) can be homopolymerized to produce useful polyamides or may be copolymerized with other polyamide-forming substances, such as ε-caprolactam, to form useful polyamide copolymers.

---

This is a division of the now abandoned, application Ser. No. 635,339, filed May 2, 1967.

BACKGROUND OF THE INVENTION

British patent specification No. 723,594 discloses that diketone 4,4'-dioxo-dicyclohexane can be reacted with sodium azide and concentrated hydrochloric acid to produce the corresponding lactam dimer, γ,γ'-bis(ε-caprolactam). British patent specification No. 824,207 discloses that dioxines of diketones, such as, for example, 1,1'-di(6-ketocyclohexyl)-methane can be subjected to the Beckmann rearrangement to form the corresponding dilactams—e.g., ε,ε'-di(ε-caprolactam)-methane. These dilactams, known to the prior art, can be polymerized to form polyamides, and can also be added, in small quantities, to more conventional polyamide-forming monomers, and the resultant mixture can be polymerized to produce polyamides with special properties. These polyamides are disclosed by, for example, British patent specification Nos. 742,479 and 880,761 and German patent specification No. 1,158,419. The above patents are hereby incorporated by disclosure.

ε,ε'-Bis(ε-caprolactam) is a novel compound which has not been known to the prior art.

OBJECTS OF THE INVENTION

It is an object of this invention to provide ε,ε'-bis(ε-caprolactam). It is an additional object of this invention to provide a process for preparing ε,ε'-bis(ε-caprolactam). It is another object of this invention to provide ε,ε'-bis(ε-caprolactam) polyamides, and the process for producing the same.

Still further objects and the entire scope of applicability of the present invention will become apparent from the detailed description given hereinafter; it should be understood, however, that the detailed description and specific examples, while indicating preferred embodiments of the invention, are given by way of illustration only, since various changes or modifications within the scope of the invention will become apparent to those skilled in the art from this detailed description.

SUMMARY OF THE INVENTION

ε,ε' - Bis(ε - caprolactam) is produced by irradiating ε-caprolactam with ultraviolet rays in the presence of a ketone activation agent. The ε,ε'-bis(ε-caprolactam) so produced may be homopolymerized or copolymerized with other polyamide-forming compounds to produce novel polyamides.

DETAILED DESCRIPTION OF THE INVENTION

According to the present invention, the novel compound ε,ε'-bis(ε-caprolactam) is prepared by subjecting ε-caprolactam in the liquid phase to dimerization conditions. The ε-caprolactam is dimerized by means of irradiation with ultraviolet rays, while in contact with a ketone activation agent, to form ε,ε'-bis(ε-caprolactam).

Although the most preferred dimerization temperature is about 90° C., dimerization proceeds readily at temperatures of 50 to 150° C., preferably 80 to 100° C. The dimerization reaction is preferably carried out at atmospheric pressures but may be conducted at superatmospheric pressures or subatmospheric pressures.

Any source of ultraviolet rays may be used to irradiate ε-caprolactam in the process of the present invention. Irradiation with sunlight produces a slight reaction but it is preferred to apply conventional artificial sources of ultraviolet rays, such as, for example, mercury lamps.

The activation agents are ketones of the formula:

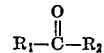

wherein $R_1$ and $R_2$ are independently selected from alkyl groups of 1 to 6 carbon atoms and phenyl radicals. Preferred activation agents are acetone, diethyl ketone and acetophenone. The activation agent may be used in an amount of from 2% by weight up to 1000% by weight and more, with respect to the weight of the lactam. The lactam may be dissolved in the activation agent (which then also acts as a solvent) or small amounts of the activation agent may be added to molten lactam. If the activation agent is to be added to the molten lactam, it is preferred that the activation agent be added in an amount of about 2 to about 25% by weight, with respect to the weight of the lactam.

During irradiation, the reaction should be maintained in an inert atmosphere, e.g., under a nitrogen blanket. During the reaction, additional, incremental amounts of the activation agent may be added, if desired.

After the dimerization reaction, the ε,ε'-bis(ε-caprolactam) may be readily recovered from the reaction mixture utilizing conventional recovery methods. For instance, the ε,ε'-bis(ε-caprolactam) is readily separated from the reaction mixture by distillation and solvent extraction.

The ε,ε'-bis(ε-caprolactam) may be homopolymerized or copolymerized with other monomeric compounds which are capable of forming polyamides by a polycondensation reaction. Suitable comonomers include, among others, ε-caprolactam, ethyl 7-aminoheptanoate, capryllactam, lauryllactam, etc. Any of the lactams disclosed in "Polyamide Resins," 2nd ed., Floyd, 1966, Reinhold Publishing Corp., N.Y., the disclosure of which is hereby incorporated by reference, may be used as the comonomers, which may be mixtures if desired, to be polymerized with ε,ε'-bis(ε-caprolactam). The polycondensation reaction conditions disclosed in British patent specifications Nos. 742,479 and 880,761 and German patent specification No. 1,158,419 may be utilized to polymerize and copolymerize ε,ε'-bis(ε-caprolactam). Preferably, the comonomer is ε-caprolactam. ε,ε'-Bis(ε-caprolactam) and ε-caprolactam may be copolymerized by the use of acidic acid and water as catalysts. For example, 4% by weight of water and 0.015% by weight of acidic acid, based on the weight of the reaction monomers, may be used, in addition, a salt of equimolar amounts of terephthalic acid and hexamethylene diamine can be used as the catalyst. Alternatively, mixtures of ε,ε'-bis(ε-caprolactam) and ε-caprolactam may be polycondensed to form polyamides by anionic polymerization with an alkaline catalyst, such as, for example, potassium caprolactam, and a suitable promoter, such as, for example, di-caprolactime ether. Other alkaline polymerisation catalysts which can be used include alkali and alkaline earth metals, particularly sodium and potassium. The oxides, hydroxides, hydrides, carbonates and other alkaline compounds of these metals can also be used. In addition, the alkali and alkaline earth metal salts of lactams and other organometallic compound, e.g., alcoholates, are suitable catalysts. The alkaline polymerization catalysts can be used in quantities ranging from 0.05 to 5% by weight, preferably from 0.1 to 1% by weight, relative to the weight of the monomer lactam. The polymerisation is initiated in a suitable way by heating the alkaline lactam melt to temperatures between about 200 and 260° C., preferably to temperatures between 220 and 240° C. There is particular advantage in adding a small quantity of polymerisation activators to the alkaline lactam melt. Suitable activators are the derivatives or organic and inorganic acids. Particularly preferred activators are the halogenides of carboxylic acids, e.g., acetyl chloride, benzoyl bromide and terephthaloyl chloride. Other suitable compounds are anhydrides, esters, amides and nitriles of organic or inorganic acids, e.g., phthalic anhydride, succinic anhydride, triphenyl phosphate or butyl stearate. The polymerisation activators can be used in quantities of 0.01 to 5% by weight, preferably 0.05 to 1% by weight, relative to the weight of the monomer lactam. To initiate the polymerisation in the presence of alkali catalysts and polymerisation activators, it is sufficient to heat lactam melt to a temperature below 220° C., e.g., from 80 to 180° C. The polyamides so obtained may be usefully employed in any of the applications wherein conventional polyamide polymers are used, such as, for instance, films, coatings, molding compositions, etc.

The invention will be understood more readily by reference to the following examples; however, these examples are intended to illustrate the invention and are not to be construed to limit the scope of the invention.

EXAMPLE I

In a 6-liter reaction vessel equipped with a stirrer, a reflux cooler, and a source of ultraviolet radiation (Philips H. P. 125 watt U.V. mercury lamp), $\epsilon$-caprolactam (2800 g.) is mixed at a temperature of 85–90° C. with acetophenone (100 g.). The mixture is irradiated for 55 hours under nitrogen, the temperature being meanwhile kept at 85–90° C. At 5 hour intervals small amounts of acetophenone (40 g.) are added.

The reaction mixture is next distilled, in which process caprolactam, acetophenone and $\alpha$-methyl benzyl alcohol are separated off. The residue (253 g.) is an orange-red vitreous product, which is extracted with boiling acetone, whereupon $\epsilon,\epsilon'$-bis($\epsilon$-caprolactam) (25 g.) in the form of a white powder, is left. The powder, which melts at 293° C. (showing some decomposition), was identified as $\epsilon,\epsilon'$-bis($\epsilon$-caprolactam) by means of nuclear spin resonance, mass spectrometry, and infrared spectroscopy.

The acetone extract analysis indicated the presence of 2,3-diphenyl butanediol-2,3 and $\epsilon$-($\alpha$-methyl-$\alpha$-hydroxybenzyl)-$\epsilon$-caprolactam.

EXAMPLE II

The $\epsilon,\epsilon'$-bis($\epsilon$-caprolactam) produced by Example I was subjected to copolymerization with $\epsilon$-caprolactam. The catalyst used consisted of 4% by weight of water and 0.015% by weight of acetic acid. The polymerization time was 16 hours at a temperature of 260° C. After the resulting polyamide had been extracted with methanol to remove nonpolymerized components, its relative viscosity was determined. The relative viscosity is defined as the viscosity of a solution of 1 g. of polyamide in 100 ml. of sulfuric acid (96% by weight) at 20° C., in relation to the viscosity of the sulfuric acid.

In addition, the melt viscosity was measured. The melt viscosity is defined as the viscosity (poises) of molten polyamide at 280° C., under a shear stress of $\tau$-dynes/cm.$^2$.

The results are shown in Table I below:

TABLE I

| | Percent by weight of $\epsilon,\epsilon'$-bis($\epsilon$-caprolactam) in $\epsilon$-caprolactam | | | | |
|---|---|---|---|---|---|
| | 0 | 1 | 1.5 | 2 | 6 |
| Relative viscosity | 3.16 | 3.27 | 4.42 | | |
| Melt viscosity: | | | | | |
| $\tau=24.5\times10^5$ | 900 | 2,072 | | | |
| $\tau=61.0\times10^5$ | 500 | 1,325 | | | |
| $\tau=122.5\times10^5$ | 300 | | | | 561,670 |

When the copolymers of Table I contained 2% and 6% by weight of $\epsilon,\epsilon'$-bis($\epsilon$-caprolactam), the resultant polyamide copolymers were insoluble in sulfuric acid.

A wide range of proportions of $\epsilon,\epsilon'$-bis($\epsilon$-caprolactam) to $\epsilon$-caprolactam or other comonomer may be used to produce novel, useful polyamide copolymers according to the present invention. Generally, the copolymers will contain at least 0.3% of $\epsilon,\epsilon'$-bis($\epsilon$-caprolactam), and can contain 5, 10, 20, 40, 60, 75, or more percent by weight of $\epsilon,\epsilon'$-bis($\epsilon$-caprolactam). Although the polyamides produced by the present invention are preferably copolymers, and most preferably copolymers containing $\epsilon$-caprolactam and at least 0.3% of $\epsilon,\epsilon'$-bis($\epsilon$-caprolactam), if desired the $\epsilon,\epsilon'$-bis($\epsilon$-caprolactam) can be homopolymerized to produce useful polyamide. It will therefore readily be seen that the proportion of $\epsilon$-caprolactam or other comonomers in the polyamides produced by the present invention can vary from 0 to 99.7% by weight, based on the weight of the total polyamide.

Obviously, many modifications and variations of the present invention are possible in the light of the above teachings. It is therefore to be understood that within the scope of the appended claims the invention may be practiced otherwise than as specifically desired.

What is claimed is:

1. A process for producing a polyamide, said process comprising polycondensing $\epsilon,\epsilon'$-bis($\epsilon$-caprolactam) with from 0% to about 99.7% by weight of a cyclic lactam, containing 6–12 carbon atoms in the ring, and in the presence of a catalyst selected from the group consisting of water, acetic acid, solutions of acetic acid in water, alkali and alkaline earth metals, the oxides, hydroxides, hydrides and carbonates of alkali and alkaline earth metals, the alkali and alkaline earth metal salts of lactams and the alcoholates of alkali and alkaline earth metals.

2. The process as claimed in claim 1 wherein said lactam is $\epsilon$-caprolactam.

3. Film-forming polyamides composed of chain units of $\epsilon,\epsilon'$-bis($\epsilon$-caprolactam) and from 0% to 99.7 weight percent of chain units of a cyclic lactam having from 6–12 carbon atoms in the ring.

References Cited

UNITED STATES PATENTS

| 3,037,001 | 5/1962 | Beck et al. | 260—78 L |
| 3,072,680 | 1/1963 | Starcher et al. | 260—78 L |
| 3,251,799 | 5/1966 | Pietrusza et al. | 260—78 LX |
| 3,342,809 | 9/1967 | Johnson | 260—78 LX |

WILLIAM H. SHORT, Primary Examiner

L. M. PHYNES, Assistant Examiner

U.S. Cl. X.R.

260—239.3 RA